No. 758,836. PATENTED MAY 3, 1904.
B. J. GUMBLE.
CLEANING ATTACHMENT FOR CURRYCOMBS.
APPLICATION FILED JAN. 19, 1904.
NO MODEL.

Witnesses
R. A. Boswell
A. L. Hough

Inventor
B. J. Gumble,
By Franklin H. Hough
Attorney

No. 758,836.

Patented May 3, 1904.

UNITED STATES PATENT OFFICE.

BERT J. GUMBLE, OF TURKVILLE, KANSAS.

CLEANING ATTACHMENT FOR CURRYCOMBS.

SPECIFICATION forming part of Letters Patent No. 758,836, dated May 3, 1904.

Application filed January 19, 1904. Serial No. 189,684. (No model.)

*To all whom it may concern:*

Be it known that I, BERT J. GUMBLE, a citizen of the United States, residing at Turkville, in the county of Ellis and State of Kansas, have invented certain new and useful Improvements in Cleaning Attachments for Currycombs; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in currycombs; and the object of the invention is to produce a device of this character in which provision is made for cleaning the comb; and the invention consists, in combination with the comb, of a spring-actuated rack having a peculiarly-shaped shank portion which is adapted to be struck against any object for the purpose of throwing the rack so that it will project beyond the teeth on the comb to relieve the same of any foreign matter.

The invention consists, further, in various details of construction and arrangements of parts, which will be hereinafter fully described and then specifically defined in the appended claims.

I illustrate my invention in the accompanying drawings, in which—

Figure 1:
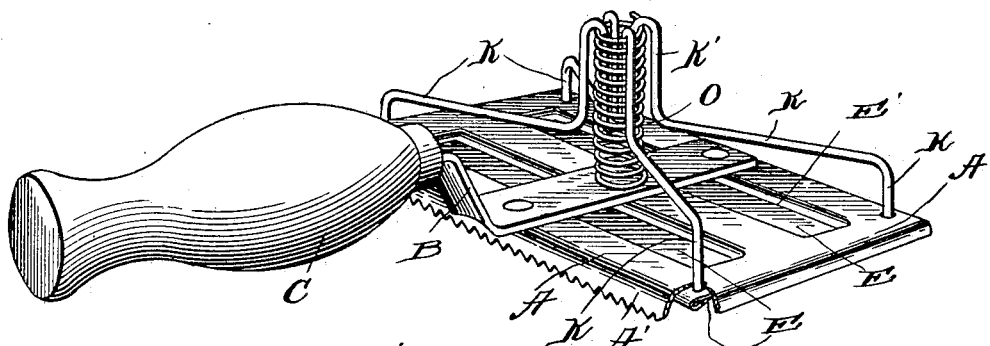
Figure 2:
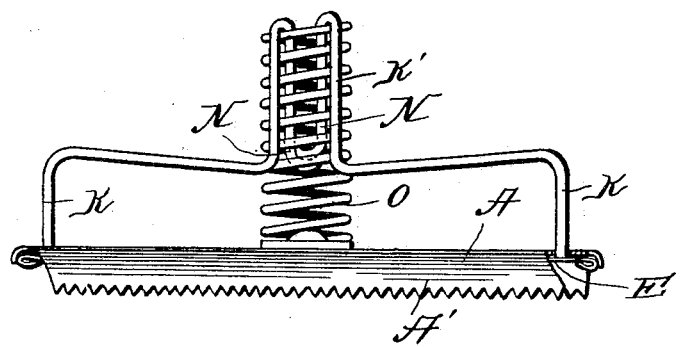
Figure 3:
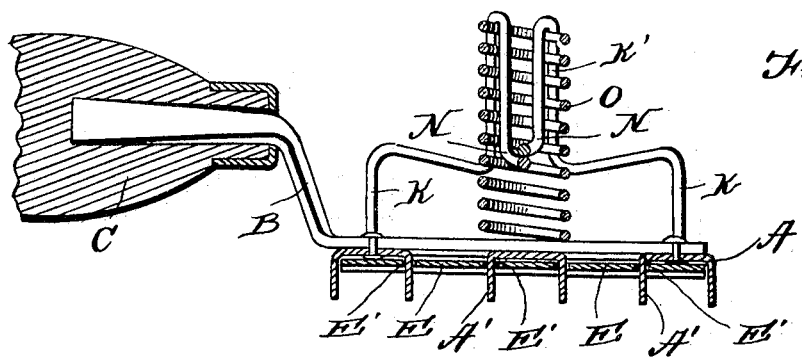

Figure 1 is a perspective view of the rear portion of my currycomb. Fig. 2 is an end view of the currycomb. Fig. 3 is a longitudinal section through the handle and transversely through the comb.

Reference now being had to the details of the drawings by letter, A designates the frame of a currycomb having parallel partitions or flanges A' with serrated edges forming teeth.

B designates a shank portion of the comb, having a handle C.

E is a rack having a series of longitudinal and parallel slots E' provided to receive the flanges having serrated edges. Fastened to each corner of the rack and passing through apertures in the corners of the comb are the wires K, each of said wires being bent in substantially M shape with a loop N, which intersect each other and are adapted to enter a coil-spring O and serve to coöperate with the portions K' of the wires to hold the spring in place.

In operating my cleaning device for currycombs the operator merely strikes the outer portions of the loops which engage the spring against any object, which will cause the spring to contract, and the rack will be thrown forward, relieving the foreign matter from the currycomb, and after which the spring will return the rack to its normal position.

While I have shown a particular detailed construction of apparatus embodying the features of my cleaning device, it will be understood that I may make alterations, if desired, in the construction of the same without in any way departing from the spirit of the invention.

Having thus described my invention, what I claim as new, and desire to secure by Letters Patent, is—

1. A device for cleaning currycombs comprising in combination with the comb having serrated flanges, a slotted yielding rack fitted over the said flanges, wires secured to said rack and extending through apertures in the comb, and serving to guide said rack, a spring bearing against said wires and adapted to normally hold the rack behind the teeth of a comb, as set forth.

2. A cleaning device for currycombs comprising in combination with the comb having serrated flanges, a yielding rack slotted and fitted over said flanges, wires secured at their ends to said rack and having portions bent to form loops which intersect each other, and a spring fitted over said intersecting loops, as set forth.

3. A cleaning device for currycombs comprising in combination with the comb having serrated flanges, a yielding rack slotted and adapted to fit over said flanges, wires secured at the corners of said rack and passing through apertures in said comb, portions of each wire being bent to form loops which intersect each other, a spring bearing against the back of the comb and in which said intersecting loops engage, portions of the wire being bent down outside of the spring and adapted to coöperate with the intersecting loops to hold the spring in place, as set forth.

In testimony whereof I hereunto affix my signature in presence of two witnesses.

BERT J. GUMBLE.

Witnesses:
A. M. KING,
N. P. RASMUSSEN.